United States Patent
Van Der Voort et al.

(10) Patent No.: US 9,693,403 B2
(45) Date of Patent: Jun. 27, 2017

(54) LIGHTING ARRANGEMENT

(71) Applicant: PHILIPS LIGHTING HOLDING B.V., Eindhoven (NL)

(72) Inventors: Ronald Hans Van Der Voort, Eindhoven (NL); Patrick Alouisius Martina De Bruycker, Eindhoven (NL); Dalibor Cvoric, Eindhoven (NL); Georg Sauerlander, Eindhoven (NL); Kumar Arulandu, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/107,156

(22) PCT Filed: Dec. 18, 2014

(86) PCT No.: PCT/EP2014/078379
§ 371 (c)(1),
(2) Date: Jun. 22, 2016

(87) PCT Pub. No.: WO2015/101506
PCT Pub. Date: Sep. 7, 2015

(65) Prior Publication Data
US 2017/0006674 A1    Jan. 5, 2017

(30) Foreign Application Priority Data

Jan. 2, 2014  (EP) ..................... 14150055

(51) Int. Cl.
*H05B 33/08* (2006.01)
*H02M 5/458* (2006.01)
(Continued)

(52) U.S. Cl.
CPC ........ *H05B 33/0815* (2013.01); *H02M 5/458* (2013.01); *H05B 33/0821* (2013.01);
(Continued)

(58) Field of Classification Search
CPC ............ H05B 33/0815; H05B 33/0818; H05B 41/2827; H05B 41/2828; H05B 41/382;
(Continued)

(56) References Cited

U.S. PATENT DOCUMENTS

2012/0029041 A1   2/2012  Haga et al.
2012/0062141 A1   3/2012  Riesebosch
(Continued)

FOREIGN PATENT DOCUMENTS

WO   WO2011033415 A1   3/2011
WO   WO2013072793 A1   5/2013
WO   WO2013164739 A1   11/2013

*Primary Examiner* — Douglas W Owens
*Assistant Examiner* — Wei Chan

(57) ABSTRACT

The invention describes a low-power load arrangement (1) comprising a low-power load (3); a driver (2) for the low-power load (3); connectors (300) for connecting to an electronic transformer (2) realized for converting a mains power supply (4) to a power supply for a normal-power load (5); and a reverse current generating means ($L_P$, SB) realized to provide a reverse current ($I_{rev\_LP}$, $I_{rev\_SB}$) to sustain self-oscillation during operation of the electronic transformer (2), wherein the direction of current flow of the reverse current ($I_{rev\_LP}$, $I_{rev\_SB}$) is opposite in direction to the output current of the electronic transformer (2). The invention further describes a lighting arrangement (1) comprising an electronic transformer (2) realized for converting a mains power supply (4) to a power supply for a normal-power load; a low-power load (3) connected to the electronic transformer (2), which low-power load (3) comprises a low-power light source (30); and wherein the lighting arrangement (1) comprises a reverse current generating means ($L_P$, SB) realized to provide a reverse current ($I_{rev\_LP}$, $I_{rev\_SB}$) to sustain transformer self-oscillation when the transformer (2) drives the low-power load (3), wherein the direction of current flow of the reverse current ($I_{rev\_LP}$, $I_{rev\_SB}$) is opposite in direc-
(Continued)

tion to the output current of the electronic transformer (2). The invention also describes a method of driving a low-power load (3) with an electronic transformer (2) realized for driving a normal-power load (5).

10 Claims, 7 Drawing Sheets

(51) Int. Cl.
*F21K 9/23* (2016.01)
*F21Y 115/10* (2016.01)

(52) U.S. Cl.
CPC ............ *H05B 33/0845* (2013.01); *F21K 9/23* (2016.08); *F21Y 2115/10* (2016.08); *Y02B 20/383* (2013.01)

(58) Field of Classification Search
CPC .............. H05B 41/2881; H05B 41/295; H05B 33/0851; H05B 37/02; H05B 41/2885; H05B 33/0824; H05B 41/2981; H05B 39/02; H05B 39/045

USPC ........ 315/291, 294, 185 R, 186, 209 R, 210, 315/219, 224

See application file for complete search history.

(56) References Cited

U.S. PATENT DOCUMENTS

| | | |
|---|---|---|
| 2012/0146537 A1 | 6/2012 | Lee |
| 2013/0043806 A1 | 2/2013 | Caldani et al. |
| 2013/0162156 A1 | 6/2013 | Oh et al. |
| 2014/0132164 A1* | 5/2014 | McBryde ........... H05B 33/0815 315/187 |
| 2014/0312796 A1* | 10/2014 | Sauerlander ....... H05B 33/0815 315/210 |
| 2014/0333205 A1 | 11/2014 | Kost et al. |
| 2016/0204692 A1* | 7/2016 | Chen ...................... H02M 1/42 315/201 |
| 2016/0205733 A1* | 7/2016 | Chen .................. H05B 33/0815 315/201 |

* cited by examiner

US 9,693,403 B2

LIGHTING ARRANGEMENT

CROSS-REFERENCE TO PRIOR APPLICATIONS

This application is the U.S. National Phase application under 35 U.S.C. §371 of International Application No. PCT/EP2014/078379, filed on Dec. 18, 2014, which claims the benefit of European Patent Application No. 14150055.3, filed on Jan. 2, 2014. These applications are hereby incorporated by reference herein.

FIELD OF THE INVENTION

The invention describes a lighting arrangement, an electronic transformer arrangement, and a low-power lighting load.

BACKGROUND OF THE INVENTION

Some types of lighting arrangements require a transformer to be used to obtain a certain voltage level. For example, halogen lamps require a transformer to convert the mains voltage to a lower level, usually 12 V. Halogen lamps typically consume 20 W-50 W of power. Generally, the transformer used to drive such a load is a switched-mode power supply that switches at a much higher frequency than the mains frequency. Usually, an electronic transformer operates according to a self-oscillating principle. However, this type of transformer does not work well with the newer LED-based lamps, since LED light sources have a much higher lumen per Watt ratio and consume significantly less power than their halogen counterparts. A self-oscillating electronic transformer requires a minimum load current (i.e. the current through the light source) in order to maintain the oscillation. However, since an LED draws significantly less current than a halogen lamp, when it is driven using an electronic transformer of the type described above, the self-oscillation of the electronic transformer can be interrupted. Particularly when a dimmer is used in conjunction with such an LED lamp, the interruptions in the electronic transformer's self-oscillations result in unstable dimmer operation. This can result in noticeable flicker in the light output of the LED.

This incompatibility is a problem when it is desired to replace a halogen light source of an existing lighting arrangement by an equivalent LED light source. Here, "equivalent" is to be understood in the context of lamp type, for example the MR16 lamp type defines the lamp socket and the lumen output. Such retro-fitting is desirable from an environmental point of view, since LED light sources generally have a significantly longer lifetime than halogen light sources, and consume significantly less power. Generally, it is only possible to access the light source of such a lighting arrangement that already includes a dimmer and transformer, but since the electronic transformer (and dimmer) cannot be accessed for modification, even by a skilled technician, an LED light source that uses relatively low power usually cannot be used to replace a "normal power" halogen light source.

Therefore, it is an object of the invention to provide an improved lighting arrangement that avoids the problems outlined above.

SUMMARY OF THE INVENTION

The object of the invention is achieved by the low-power load arrangement of claim 1; by the lighting arrangement of claim 5; and by the method of claim 15 of driving a low-power load.

According to the invention, the low-power load arrangement comprises a low-power light source; a driver for driving the low-power light source; input terminals for connecting to an electronic transformer that is realised for converting a mains power supply to a power supply for a normal-power load; and a reverse current generating means realised to provide a reverse current to sustain self-oscillation during operation of the electronic transformer.

An electronic transformer is generally designed for use with a load within a certain power range, i.e. the rated power. Components of the electronic transformer are chosen so that the electronic transformer and load operate satisfactorily within that power range. Here, the term "normal-power load" is to be understood as a load with a rated power to suit the intended application of the electronic transformer, since the power rating of an electronic transformer must be matched to the power rating of its load. For example, if the electronic transformer is designed to drive a load with a rated power of 40 W, then the "normal power" of a load would be 40 W. A "low-power load" is therefore a load with a rated power that is significantly lower than the rated power of the "normal-power" load to which the electronic transformer is matched, so that the electronic transformer cannot be directly used to drive that load without difficulties or negative side-effects. In the context of the invention, the term "normal-power load" is to be understood as a load that consumes at least 20 W, the electronic transformer is to be understood to be realised to drive such a normal-power load, and the term "low-power load" is to be understood as a load that consumes power in the region of at most 7 W.

An electronic transformer is realised to provide an output current or "forward current" to the load circuit, i.e. an output current having a polarity such that energy is transferred from the electronic transformer to the load circuit. Therefore, in the context of the invention, the reverse current is a current whose direction of current flow is opposite in direction to the output current or "forward current" of the electronic transformer.

An advantage of the low-power load arrangement according to the invention is that, even though the electronic transformer was originally explicitly designed for driving a normal-power load, it can be used to supply power to the low-power light source. In this way, with a relatively simple modification to an existing type of low-power load arrangement such as an LED lighting arrangement, this can be used with the older types of electronic transformers, avoiding unnecessary waste as indicated above.

According to the invention, the lighting arrangement comprises an electronic transformer realised for converting a mains power supply to a power supply for a normal-power load; and a low-power load connected to the electronic transformer, which low-power load comprises a low-power light source; wherein the lighting arrangement comprises a reverse current generating means realised to provide a reverse current to sustain transformer self-oscillation when the transformer drives the low-power load, and wherein the reverse current is a current whose direction of current flow is opposite in direction to the output current of the electronic transformer.

An advantage of the lighting arrangement according to the invention is that, with only a minor adjustment, it is possible to use an electronic transformer—originally designed for driving a normal-power load—to drive a low-power load such as a low-power light source in such a way that the electronic transformer continues to oscillate satisfactorily even at very low load current levels. In this way, the useful lifetimes of older generation electronic transformers can be extended, avoiding unnecessary waste and the associated negative effect on the environment, and newer low-power loads can be driven using those electronic transformers and can be used without first having to specifically design and manufacture dedicated transformers. The lighting arrangement according to the invention makes it possible to retro-fit an existing lighting arrangement, e.g. by replacing only the light source by an LED light source, leaving the electronic transformer (and dimmer) unchanged. The reverse current generating means ensures that the electronic transformer will operate stably even though the low-power load draws considerably less load current than the normal-power load.

According to the invention, the method of driving a low-power load comprises the steps of connecting the low-power load to an electronic transformer, which electronic transformer is realised for converting a mains power supply to a power supply for a normal-power load; and providing a reverse current to sustain transformer self-oscillation when the electronic transformer drives the low-power load.

An advantage of the method according to the invention is that, by simply providing a suitable reverse current, a low-power load such as a retro-fitted low-power light source can be driven by an electronic transformer that is intended to drive a normal-power load. In this way, for example, older lighting arrangements can be upgraded in a relatively economical and straightforward manner to use low-power light sources such as LEDs, without any of the usual disadvantages of poor dimmer and transformer compatibility and resulting visible flicker.

The dependent claims and the following description disclose particularly advantageous embodiments and features of the invention. Features of the embodiments may be combined as appropriate. Features described in the context of one claim category can apply equally to another claim category.

In the following, but without restricting the invention in any way, it may be assumed that a "normal-power load" is a load such as a halogen lamp arrangement, and the electronic transformer is realised primarily to drive such a load. According to the invention, the use of such an electronic transformer is adapted so that a "low-power load" can be driven without perceptible and irritating flicker. Again, without restricting the invention in any way, it may be assumed in the following that the low-power light source comprises one or more LEDs.

In a preferred embodiment of the invention, therefore, the electronic transformer comprises a transformer that has been primarily realised for driving a "normal power" load comprising one or more 20 W-60 W MR16 halogen lamps. With the reverse-current generating means of the lighting arrangement according to the invention, this electronic transformer can operate in a stable manner—i.e. without undesirable interruption of its self-oscillation and therefore without any resulting negative or perceptible side-effects—when it is used to drive one or more low-power load arrangements according to the invention, that collectively consume significantly less power than such a "normal power" load. For example, a low-power load can comprise several low-power load arrangements according to the invention connected in a parallel configuration.

In a preferred embodiment of the invention, the low-power light source comprises a number of light-emitting diodes (LEDs). Since LEDs consume relatively low levels of power, and since developments in LED design are leading to further decreases in their power consumption, the lighting arrangement according to the invention preferably comprises a low-power light source that is realised to consume at most 7 W, preferably at most 4 W. Of course, with appropriate choice of electronic components, the lighting arrangement according to the invention could even be used to drive a low-power load that consumes less than 4 W without any interruptions in the self-oscillation of the electronic transformer. The lighting arrangement according to the invention does not impose a minimum power requirement on the low-power light source that it uses, in contrast to the prior art solutions.

There are various ways of realising a transformer for reducing a mains power supply (usually 230 V and 50 Hz in Europe, or 110 V in the USA) to a level that is safe to use with devices such as small household appliances, consumer electronics or lighting applications that use light sources such as halogen lamps. In the following, but without restricting the invention in any way, it may be assumed that the electronic transformer is a switched-mode power supply with a switching frequency that is considerably higher than the mains frequency.

Generally, an electronic transformer will have a rectifier at its input, a half-bridge circuit with a pair of transistor switches for self-oscillation, a start circuit for triggering the self-oscillation, a drive transformer for driving the transistor switches, and a main transformer for coupling to the load across the outputs of the electronic transformer. The load to be driven by the electronic transformer is connected across the secondary winding of the main transformer. Preferably, each transistor switch is a current-driven switch such as a bipolar junction transistor (BJT). In the following, for the sake of simplicity but without restricting the invention in any way, it will be assumed that a BJT is used. Usually, a transistor switch of an electronic transformer is equipped with an anti-parallel diode to facilitate inductive load current flow.

The principle of operation of the electronic transformer is that once a trigger pulse from the start circuit has started the self-oscillation, this persists without interruption between start and end points within a mains half-period. Close to a mains zero-crossing, the self-oscillation stops, and is re-triggered again shortly after the zero-crossing by a new trigger pulse. As long as the load draws enough current, the self-oscillation persists between these start and end points, and an essentially square-wave output voltage and current (with an envelope according to any dimming performed on the mains signal) are provided at the secondary winding of the main transformer. The self-oscillation is a result of an interaction between the transistors, the drive transformer, the main transformer and the load current. The transistors switch rapidly on and off in an alternating manner. Whenever one transistor is "active" i.e. conducting, the other is "inactive" i.e. not conducting. The switching frequency is generally much higher than the mains frequency.

In order for a BJT of the electronic transformer to switch on and to conduct, its base current must reach a minimum level. This base current is closely dependent on the current drawn by the load. A low-power load, when driven directly by such an electronic transformer, will not always be able to reliably draw enough current to keep the transistors switching, so that the self-oscillation is interrupted. In a preferred embodiment of the invention, therefore, the reverse current generating means is realised to inject the reverse current from the load side into the main transformer, so that this reverse current results in a corresponding current at the primary side of the main transformer, and is therefore "available" to assist in transistor switching. Preferably, the reverse current—and therefore the corresponding current at the main transformer primary side—is provided to maintain and/or augment the base current of the active transistor. The reverse current acts to reduce the average load power while maintaining a minimum base current required for operation of the active transistor. In this way, by ensuring that the active transistor can always conduct, the self-oscillation proceeds without interruption. This reverse-current generating means can be realised in a number of ways, as will be explained in the following.

In one particularly preferred embodiment of the invention, the reverse-current generating means comprises an inductor arranged in parallel with the low-power load, combined with a pulsed-mode operation of the low power load, for example by using a switched-mode power supply that provides output voltage and current in the form of high-frequency pulses. The "parallel inductor" acts to inject the reverse current into the secondary winding of the main transformer as explained above, thereby promoting the self-oscillating function of the transformer. The reverse current is applied directly whenever the output voltage commutates as a result of the self-oscillation of the electronic transformer. Due to the reactive nature of the parallel inductor, the current through the inductor directly after output voltage commutation is opposite to the polarity of the output voltage, and therefore the direction of the inductor current is opposite to the direction of the current output by the electronic transformer, i.e. the inductor current is a 'reverse current'. In this way the combination of parallel inductor and pulsed-mode operation of the low-power load reduces the average load power while maintaining a minimum base current that is required for operation of the active transistor.

A low-power load such as an LED driver can comprise a boost converter. This can be realised as a power buffer stage following a power input stage with input terminals for connecting to the output terminals of the electronic transformer, whereby the parallel inductor is connected across these terminals, either as part of the electronic transformer or—more preferably—as part of the low-power load. In a preferred embodiment of the invention, the low-power load comprises a pulsed-mode timing circuit for the boost converter. As mentioned above, the electronic transformer is effectively a switched-mode power supply that switches at a much higher frequency than the mains frequency. Therefore, in a further preferred embodiment of the invention, the low-power load comprises a synchronisation module realised to synchronise the timing circuit to a switching frequency of the electronic transformer, e.g. for controlling the boost converter in a pulsed-mode mode of operation.

The combination of the parallel inductor and pulsed-mode operation has the advantageous effect of reducing the average load power.

In an alternative preferred embodiment of the invention, the reverse-current generating means comprises a bridgeless synchronous boost converter used in place of the simple arrangement comprising rectifier and boost converter that is generally used in prior art arrangements as the input stage of a low-power lighting load. A bridgeless synchronous boost converter is generally used as a driver in a high-power application to improve the efficiency of a high-power load. Therefore, such an embodiment of the lighting arrangement according to the invention uses the synchronous boost converter in an atypical application, i.e. an application for which it would not normally be considered.

During development of the lighting arrangement, the inventors observed that a bridgeless synchronous boost converter can lend itself well to the creation of a reverse current in the electronic transformer, since its input current can be bidirectional. A bridgeless synchronous boost converter for use with a bidirectional input voltage and current is usually based on a design with four metal-oxide-semiconductor field-effect transistors (MOSFETs) in a full bridge configuration. A suitable timing module is usually used to generate appropriate gate control signals for the MOSFETs in order to control the amplitude of the load current. When used in a lighting arrangement according to the invention, the bi-directional voltage to the synchronous boost converter is the output voltage of the electronic transformer, and the timing module is configured to control the MOSFET gates in order obtain a load current with a desired timing and amplitude. Preferably, the synchronous boost converter is controlled to provide a reverse current after each commutation of its input voltage. The commutation of the input voltage may be regarded as the 'event' that triggers generation of the reverse current. By generating the reverse current upon commutation of the input voltage, energy is transferred from the load circuit back into the electronic transformer. In this way, even a low-power load can be made compatible with an electronic transformer that is in fact realised to drive a normal-power load.

A boost converter generally already comprises modules such as a timing module, synchronisation module, etc. Therefore, in a further preferred embodiment of the invention, the synchronous boost converter also comprises a control module realised to control the duration of the reverse current to be injected back into the electronic transformer. By appropriate configuration of these modules, it is relatively straightforward to obtain a reverse current with a desired magnitude and duration that can be precisely timed to maintain the self-oscillation of the electronic transformer. For instance, the magnitude of the reverse current can be adapted to keep either one of the transistors of the electronic transformer in a conductive state.

Both of the approaches described above make it possible to maintain the self-oscillation of an electronic transformer and at the same time to reduce the average load power. The reverse-current generating means can be incorporated into the lighting arrangement in any suitable way. To facilitate retro-fitting of existing lighting arrangements, for example to be able to replace an MR16 halogen lamp by an LED lamp, the reverse current generating means can be included in the LED lamp. For example, a parallel inductor of appropriate size can be connected across the input terminals of the LED lamp, so that even a very low-power LED lamp can be used with the type of electronic transformer realised to drive a typical 20 W, 35 W or 50 W lamp, for example an MR16 halogen lamp or other low-voltage lamp such as AR111 lamps, MR11 lamps, G4 lamps, etc.

Usually, lighting circuits based on halogen lamps such as MR16 lamps are also equipped with a dimmer so that the light output of the light source can be dimmed as desired. Such a dimmer can be a leading-edge dimmer, for example. Therefore, in a further preferred embodiment of the invention, the lighting arrangement comprises a dimmer realised for dimming the light output of the lighting load connected to the electronic transformer. Such a dimmer is generally arranged between the mains power supply and the electronic transformer.

Various versions of lighting arrangement circuits were tested in development of the lighting arrangement according to the invention, and some of these will be explained below.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
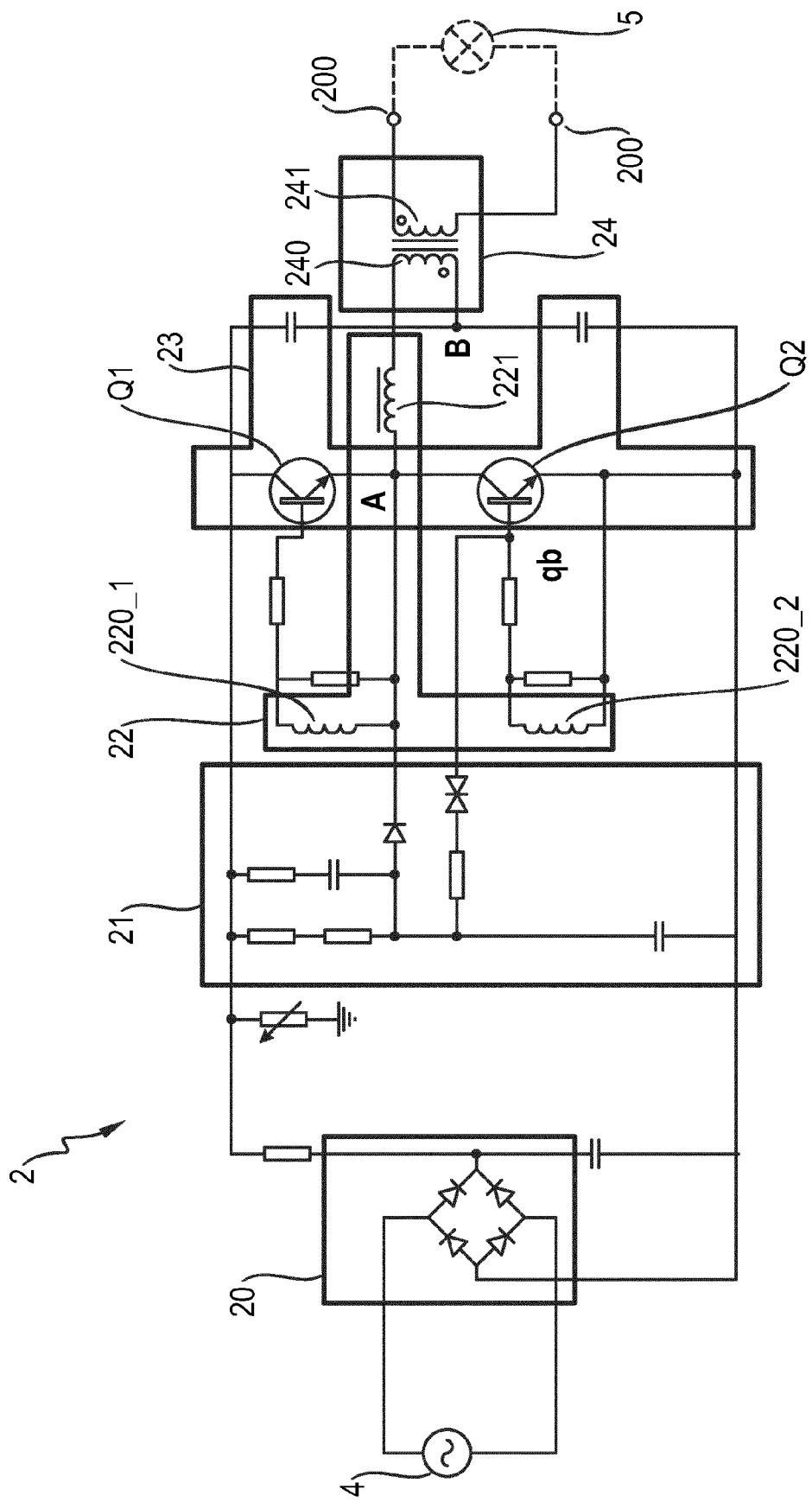
FIG. 1 shows a simplified circuit diagram of an electronic transformer 2.

FIG. 1 shows a simplified circuit diagram of an electronic transformer 2. This comprises a rectifier 20 at an input stage, and can be connected directly to a mains power supply 4 as shown here, or to the output of a dimmer such as a leading-edge dimmer. The electronic transformer 2 comprises a starter circuit 21 that triggers the alternating switching behaviour of a transistor pair Q1, Q2 of a half-bridge circuit 23; a drive transformer 22 for driving the transistors Q1, Q2, and a main transformer 24 for coupling to a load 5. The main transformer 24 has a primary winding 240 and a secondary winding 241. The drive transformer 22 has two secondary windings 220_1, 220_2 (each of which is associated with one of the transistors Q1, Q2) and a primary winding 221 in series connected to the primary winding 240 of the main transformer 24. The switching frequency of the electronic transformer 2, i.e. its self-oscillation frequency, is largely determined by the interaction between the transistors Q1, Q2, the drive transformer 22, the main transformer 24 and the current drawn by the load. An electronic transformer 2 that is intended to drive a load 5 such as a halogen MR16 lamp is typically optimized for load power consumption of 20-60 W. This diagram shows that a normal power load 5 can be connected across output terminals 200 of the electronic transformer 2.

Figure 2:
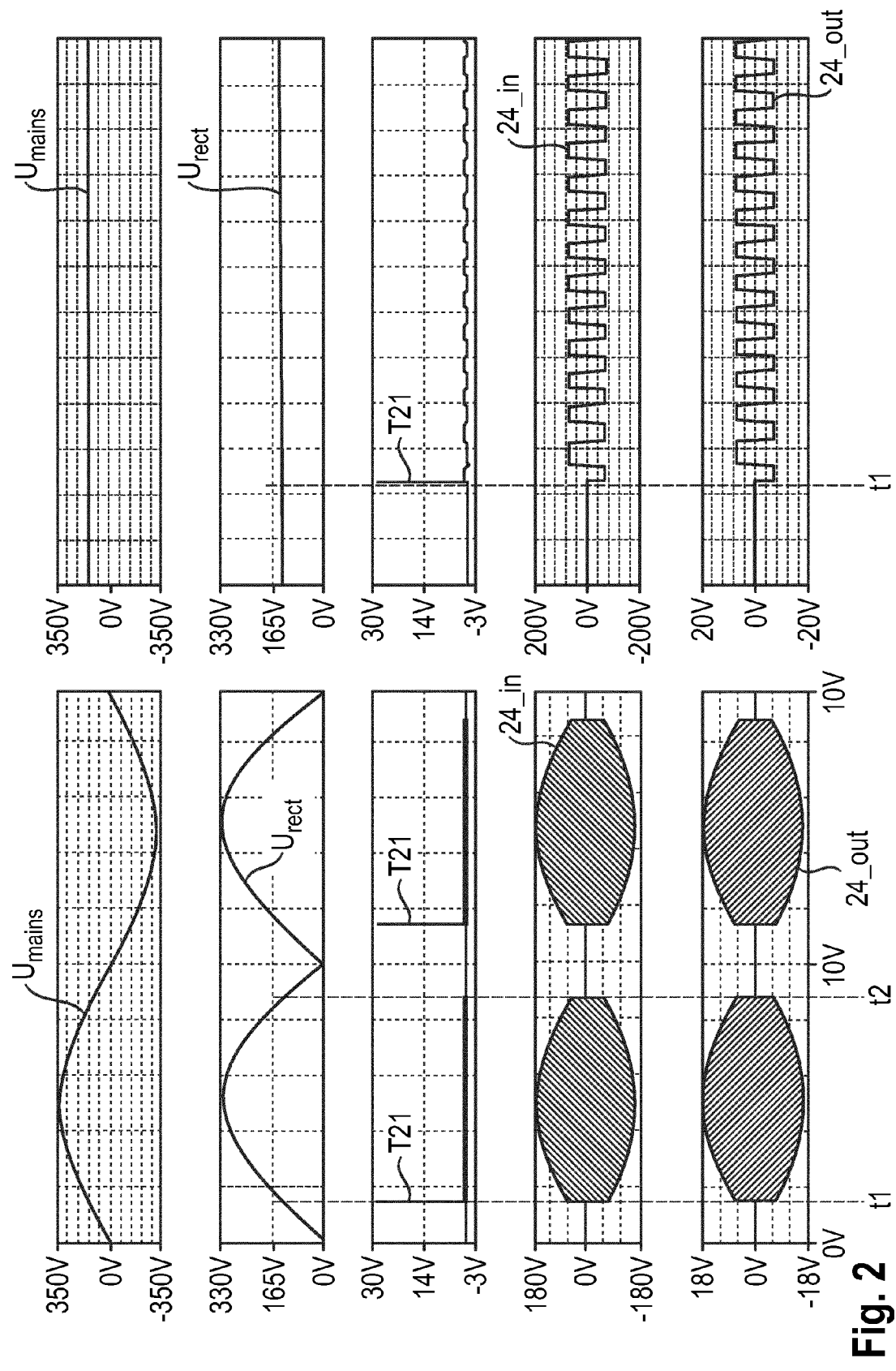
FIG. 2 shows waveforms relating to the electronic transformer of FIG. 1.

FIG. 2 shows waveforms relating to the electronic transformer 2 of FIG. 1. On the left-hand side, the waveforms are shown over a complete mains cycle. An input mains voltage $U_{mains}$ is rectified to give a rectified signal $U_{rect}$. Some time after mains zero-crossing ("commutation"), when the rectified voltage $U_{rect}$ has reached a certain level, the starter circuit generates a trigger pulse T21, which triggers the self-oscillating behaviour characterized by the alternating switching of the transistors Q1, Q2. On the right-hand side, the waveforms are expanded over a fraction of the mains cycle close to the trigger pulse T21. The self-oscillation is clearly indicated in the expanded voltage waveforms on the right-hand side, which show the input and output voltages 24_in, 24_out on the primary and secondary windings of the main transformer 24 oscillating at the "self-oscillation frequency".

The mains voltage $U_{mains}$ and rectified voltage $U_{rect}$ have essentially the same peak value. The peak value of the input voltage 24_in at the mains primary is about half the mains peak value. The peak value of the output voltage 24_out at the mains secondary depends on the winding ratio. The input voltage 24_in and output voltage 24_out each have an envelope derived from the rectified mains signal $U_{rect}$.

Some time prior to the next zero-crossing, when the rectified voltage $U_{rect}$ drops to a certain level, the self-oscillation ceases and will resume again when the starter circuit 21 issues the next trigger pulse T21. Between times t1, t2, the self-oscillation should not be interrupted, but this cannot be guaranteed if the load connected at the output of the electronic transformer 2 has a rated power that is lower than the power rating for which the electronic transformer 2 is designed.

Figure 3:
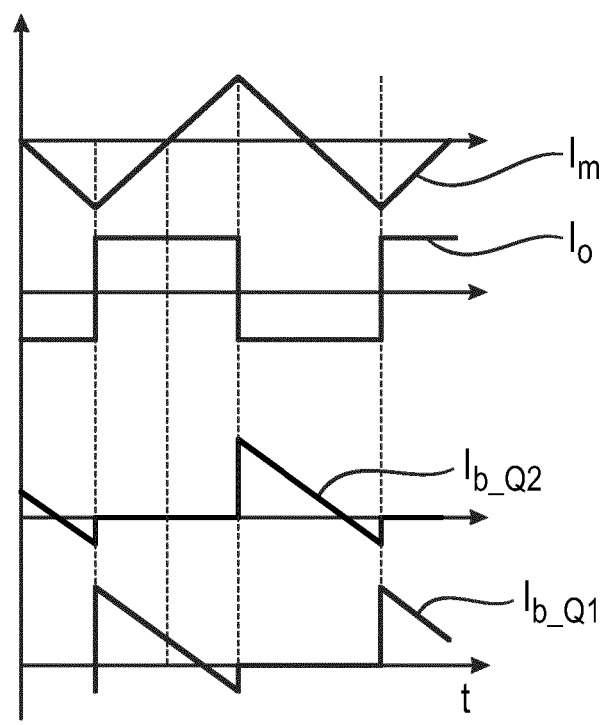
FIG. 3 shows exemplary waveforms illustrating the principle of self-oscillation of the electronic transformer of FIG. 1.

FIG. 3 shows exemplary waveforms illustrating the principle of self-oscillation, on the basis of an equivalent circuit of the electronic transformer 2 of FIG. 1. An output current $I_o$, representing the current through the load, has an essentially square-wave shape. A magnetizing current $I_m$, representing the current through the magnetizing inductance of the drive transformer, has an essentially triangular shape. The base currents $I_{b\_Q1}$, $I_{b\_Q2}$ through the transistors Q1, Q2 are intermittently present, each commencing with a peak value and decreasing to a value below zero, due to storage time effects of the BJT. When a first transistor is active, the second is inactive, and vice versa. The voltage across the magnetizing inductance of the drive transformer is defined by the voltage across the base-emitter junction of the active transistor. It can be assumed this is a fixed voltage of 0.7 V when using a transistor such as a BJT. This voltage determines the magnetizing current $I_m$. When the active transistor is conducting, the current through its base emitter junction is given by the difference between the output current reflected to the secondary side of the drive transformer, and the magnetizing current $I_m$. The active transistor keeps conducting until the conduction charge is removed from its base. At that point, the energy stored in the magnetizing inductance results in turning on the other transistor, and the load current $I_o$ changes direction. In this simplified model, the peak current through the base emitter junction of a transistor Q1, Q2 is somewhat more than twice the reflected output current.

The current drawn by the load can affect the ability of the electronic transformer to maintain or sustain the self-oscillation described above. The self-oscillation cycle continues indefinitely when the load draws a sufficient load current. However, when the load connected to the electronic transformer does not draw enough current, as can be the case when the electronic transformer is used to drive a load with a power rating below the power rating for which the electronic transformer has been designed, the active transistor is not properly switched on (not driven in saturation), so that the cycle described in FIG. 3 above will be interrupted. Another trigger from the start circuit 21 is required in order for the self-oscillation to commence again. When the low-power load is a lighting load, the interruption may also affect the behaviour of a dimmer preceding the electronic transformer, so that noticeable flicker may result.

Figure 4:
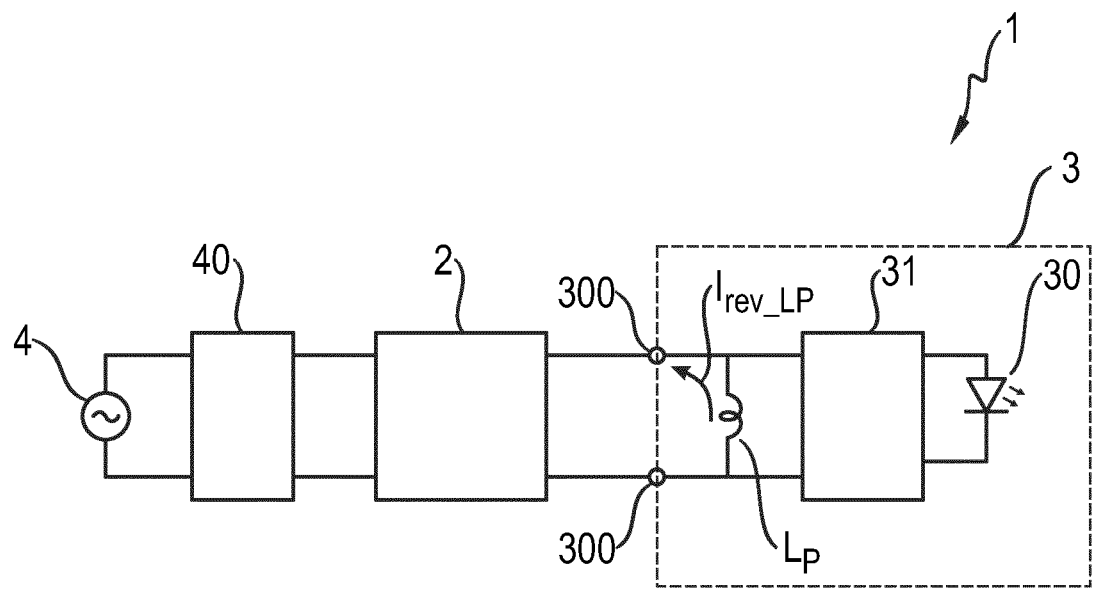
FIG. 4 shows a first embodiment of a lighting arrangement according to the invention.

FIG. 4 shows a first embodiment of a lighting arrangement 1 according to the invention. Here, the lighting arrangement 1 comprises a low-power load arrangement 3 comprising an LED light source 30 and an LED driver 31.

The LED driver 31 can comprise the usual modules such as boost converter, etc., and the boost converter is driven in a pulsed mode of operation, so that boost current is "off" for a portion of its switching cycle after zero-crossing of the load voltage. The lighting arrangement 1 further comprises an electronic transformer 2 realised to drive a normal-power load. In this embodiment, a dimmer 40 is placed between the power supply 4 and the electronic transformer 2. The load 3 is connected to the electronic transformer 2 by suitable connectors 300 such as MR16 pins for connecting to output terminals of the electronic transformer 2. In this exemplary embodiment, the lighting arrangement 1 further comprises a parallel inductor $L_P$ that injects a reverse current $I_{rev\_LP}$ into the secondary winding of the main transformer of the electronic transformer 2 whenever the output voltage across the connectors 300 commutates and the boost converter is switched off for a portion of half of a switching cycle of the electronic transformer. In accordance with the invention, the reverse current is injected independently of the converter current. For example, the reverse current can be generated at a moment between 0 second after commutation and a period of e.g. one fourth (¼) of a switching cycle after commutation.

Figure 5:
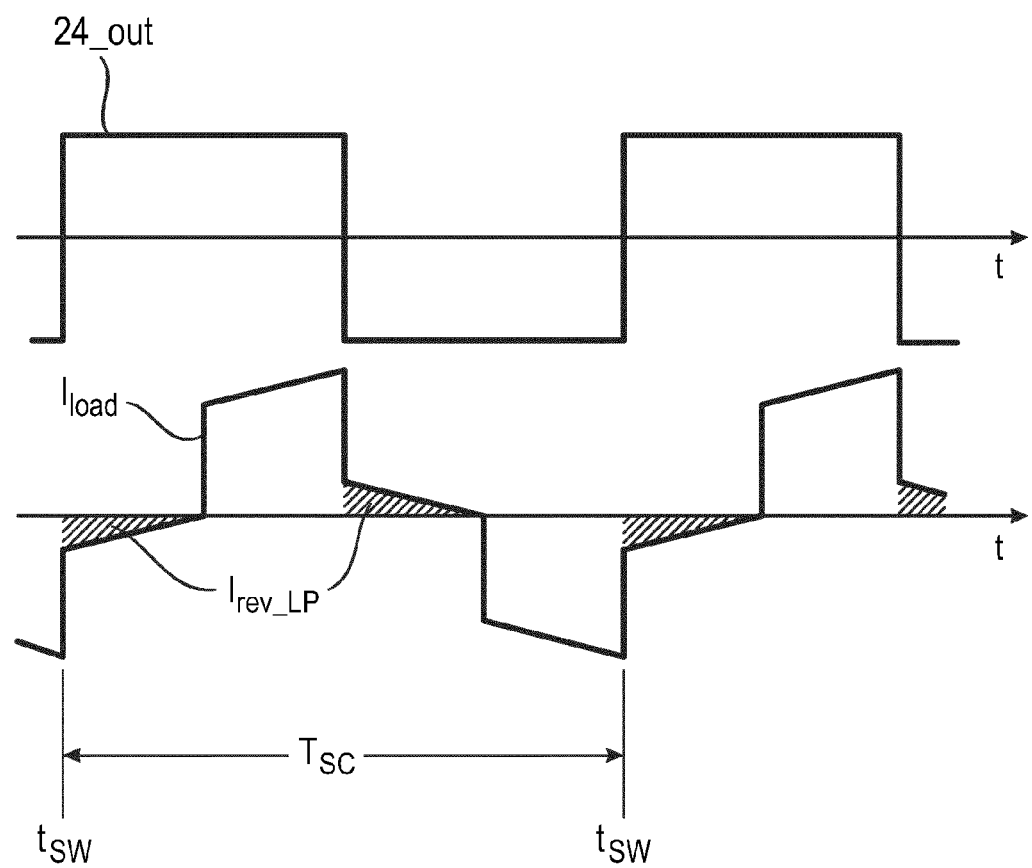
FIG. 5 shows ideal waveshapes obtained when operating the lighting arrangement of FIG. 4.
Figure 5:
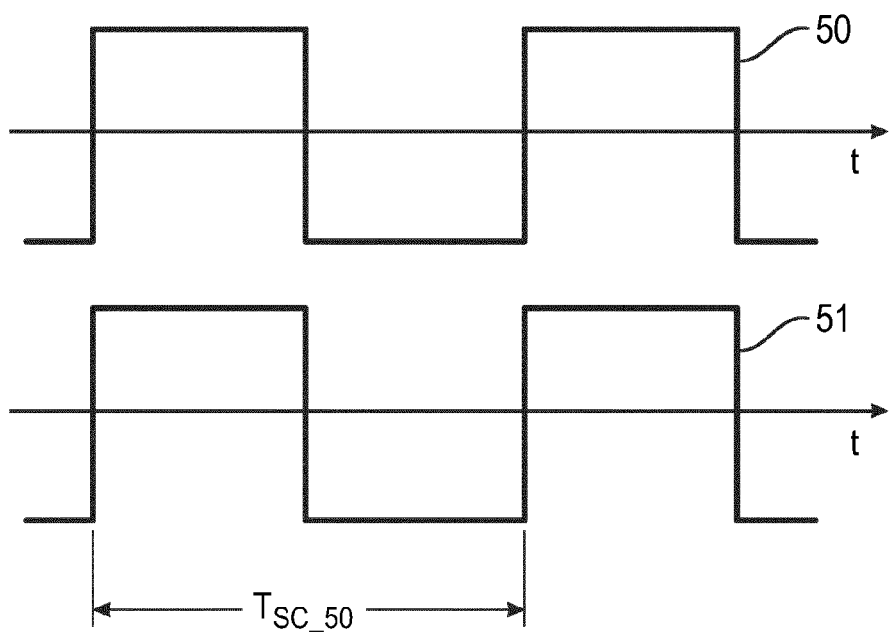

FIG. 5 shows ideal waveshapes (in the upper part of the diagram) obtained when operating the lighting arrangement of FIG. 4; as well as ideal waveshapes 50, 51 (in the lower part of the diagram) obtained for a prior art configuration without any parallel inductor between main transformer and LED driver. Here, the output voltage 50, 24_out of the electronic transformer 2 oscillates as a square wave. Without the parallel inductor, the load current 51 would also have an essentially square-wave shape. In the embodiment of FIG. 4, the load current $I_{load}$ effectively comprises the reverse current $I_{rev}$_LP as a linear ramp portion overlaid on the pulsed boost current, so that the polarity of the load current $I_{load}$ is opposite to the polarity of the load voltage 24_out over a portion of the switching cycle $T_{SC}$ following each zero-crossing of the load voltage 24_out at switching time $t_{SW}$. This diagram also shows that the switching cycle $T_{SC}$ of the electronic transformer 2 used in the configuration of FIG. 4 is longer than the switching cycle $T_{SC\_5}$ of the electronic transformer 2 used in a "normal" or prior art configuration.

Figure 6:
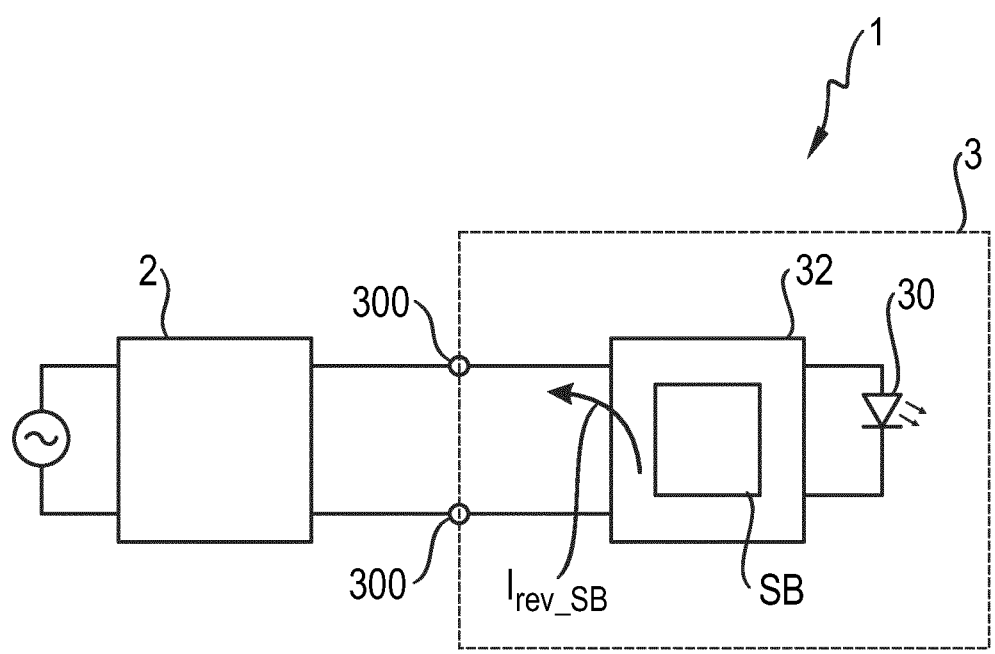
FIG. 6 shows a second embodiment of a lighting arrangement according to the invention.

FIG. 6 shows a second embodiment of a lighting arrangement 1 according to the invention. Here also, the lighting arrangement 1 comprises a low-power load arrangement 3 comprising an LED light source 30, an electronic transformer 2 realised to drive a normal-power load, and the load 3 is connected to the electronic transformer 2 by suitable connectors 300. In this realisation, the low-power load 3 comprises an LED driver 32 that incorporates a bridgeless synchronous boost converter SB configured to inject a reverse current $I_{rev\_SB}$ into the secondary winding of the main transformer of the electronic transformer 2 whenever the output voltage across the connectors 300 commutates. A desired polarity and duration for the reverse current $I_{rev\_SB}$ can be achieved by configuring the synchronous boost converter SB so that appropriate control signals are applied to the gates of the MOSFETs.

Figure 7:
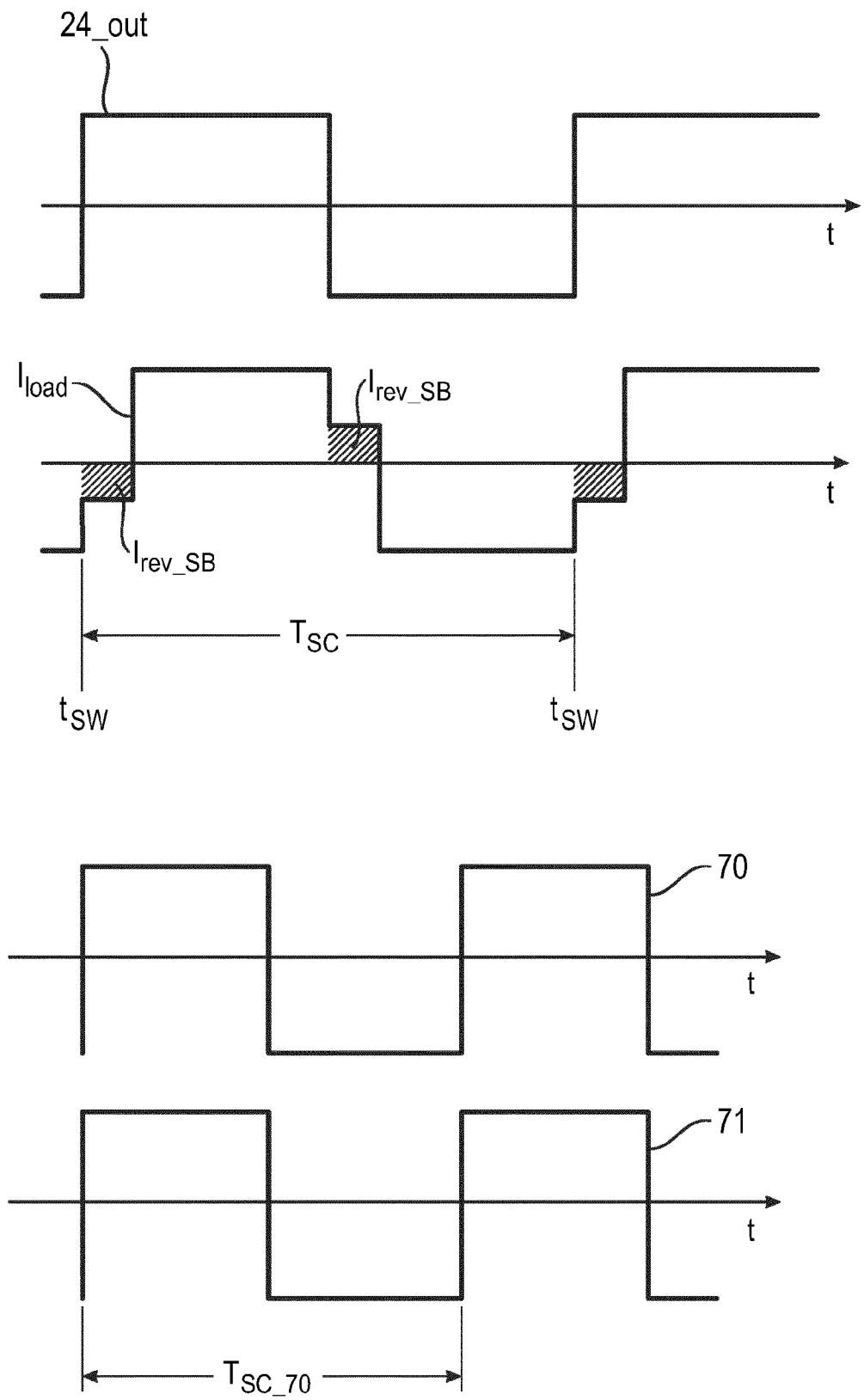
FIG. 7 shows ideal waveshapes obtained when operating the lighting arrangement of FIG. 6.

This is illustrated in FIG. 7, which shows (in the upper part of the diagram) ideal waveshapes 24_out, $I_{load}$ obtained when operating the lighting arrangement of FIG. 6; as well as ideal waveshapes 70, 71 (in the lower part of the diagram) obtained when a bridgeless synchronous boost converter is not controlled to generate a reverse current. In each case, the output voltage 70, 24_out of the electronic transformer 2 oscillates as a square wave. Without the reverse-current generating means, the load current 71 would also have an essentially square-wave shape. However, using the circuit of FIG. 6, the reverse current $I_{rev\_SB}$ injected into the electronic transformer 2 by the low-power load 3 is effectively "subtracted" from the square wave shape of the load current $I_{load}$. Therefore, for a predetermined time after commutation of the output voltage 24_out, the load current $I_{load}$ has a polarity opposite to that of the output voltage 24_out, and this is essentially the "reverse current" $I_{rev\_SB}$. In order to maintain the self-oscillation of the electronic transformer 2, the reverse current $I_{rev\_SB}$ is injected directly after the commutation instant or switching time $t_{SW}$. In this way, it is possible to maintain the self-oscillation of the electronic transformer 2, even though the average load power consumed by the low-power load 3 in the lighting arrangement 1 of FIG. 6 may be considerably lower than the power consumed by a "normal-power" load driven by this electronic transformer 2 to drive a normal-power load. Here, the reverse current $I_{rev\_SB}$ has a pulse shape and is injected for a duration of about one eighth of a switching cycle $T_{SC}$ of the electronic transformer 2. This diagram also shows that the switching cycle $T_{SC}$ of the electronic transformer 2 used in the configuration of FIG. 6 is longer than the switching cycle $T_{SC\_70}$ of the electronic transformer 2 used in a "normal" or prior art configuration.

Figure 8:
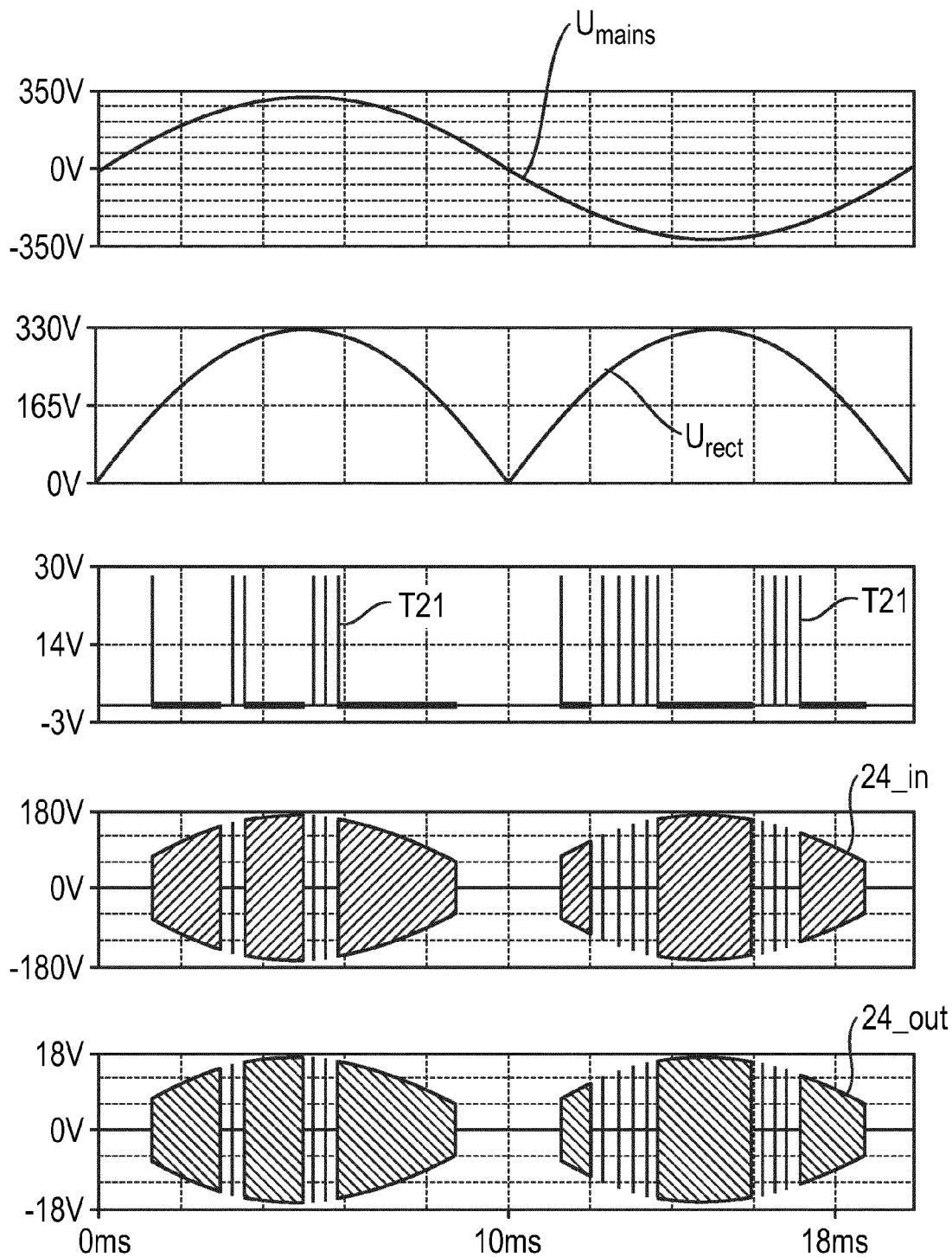
FIG. 8 illustrates the behaviour of the electronic transformer of FIG. 1 when used to drive a low-power load in a prior art arrangement.

FIG. 8 illustrates a problem that may arise when using an electronic transformer of FIG. 1 to drive a low-power load directly, i.e. in a prior art arrangement and without any reverse-current generating means, and shows waveforms similar to those of FIG. 2 over an exemplary time-frame. Here, interruptions in the self-oscillation are shown. These are typically the result of a load current that is too low for the electronic transformer 2. After every interruption in the self-oscillation, the starter circuit 21 issues a trigger pulse T21 to re-start the self-oscillation. The voltages 24_in, 24_out at the main transformer 24 are also interrupted for as long as the transistors Q1, Q2 are unable to conduct. This unstable behaviour is very unsatisfactory and can result in visible flicker, particularly if the low-power load is a lighting unit, and may also compromise the behaviour of a dimmer preceding the electronic transformer 2.

Although the present invention has been disclosed in the form of preferred embodiments and variations thereon, it will be understood that numerous additional modifications and variations could be made thereto without departing from the scope of the invention. Most concepts of the invention can also be applied when using a magnetic transformer to drive an LED lamp—if the reverse-current generating means is a parallel inductor, this should be disconnected; if the reverse-current generating means is a synchronous boost converter, no modifications are required. For the sake of clarity, it is to be understood that the use of "a" or "an" throughout this application does not exclude a plurality, and "comprising" does not exclude other steps or elements.

The invention claimed is:

1. A low-power load arrangement comprising
a low-power light source;
a driver for the low-power light source;
input terminals (300) for connecting to a self-oscillating electronic transformer, wherein the electronic transformer is matched to a normal-power load and arranged to provide an output current; and
a reverse current generating means arranged to provide a reverse current whenever a voltage across the input terminals commutates during operation of the electronic transformer, the reverse current having a direction of current flow that is opposite to the output current of the electronic transformer thereby transferring energy to the electronic transformer so as to sustain self-oscillation of the electronic transformer, wherein the reverse current generating means comprises an inductor connected across the input terminals or a bridgeless synchronous boost converter.

2. A low-power load arrangement according to claim 1, wherein the synchronous boost converter is realised to control a duration of the reverse current generated by the synchronous boost converter.

3. A lighting arrangement comprising the low-power load arrangement according to claim 1, and the electronic transformer.

4. A lighting arrangement according to claim 3, wherein the electronic transformer comprises a main transformer and wherein the reverse current generating means is realised to inject the reverse current into the main transformer.

5. A lighting arrangement according to claim 3, wherein the electronic transformer comprises a pair of transistor switches, and wherein the reverse current is provided to augment and/or maintain the base current of the transistor switches.

6. A lighting arrangement according to claim 3, wherein the reverse current is generated over at most one quarter of a switching cycle of the electronic transformer.

7. A lighting arrangement according to claim 3, wherein the electronic transformer is realised for a driving a load with a normal rated power in the range of 20 W-60 W.

8. A lighting arrangement according to claim 3, wherein the low-power light source is realised to consume power in the range of 3 W-6 W.

9. A lighting arrangement according to claim 3, wherein the low-power light source comprises a number of light-emitting diodes.

10. A lighting arrangement according to claim 3, comprising a dimmer preceding the electronic transformer.

* * * * *